(12) United States Patent
Okuno

(10) Patent No.: US 6,542,677 B2
(45) Date of Patent: Apr. 1, 2003

(54) AMPLIFICATION OPTICAL FIBER AND FIBER OPTIC AMPLIFIER INCLUDING THE SAME

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 196 days.

(21) Appl. No.: 09/731,819

(22) Filed: Dec. 8, 2000

(65) Prior Publication Data

US 2003/0035639 A1 Feb. 20, 2003

(30) Foreign Application Priority Data

Dec. 10, 1999 (JP) ............................................. 11-351782

(51) Int. Cl.[7] ................................................ G02B 6/02
(52) U.S. Cl. ........................ 385/123; 385/124; 385/127; 359/341.3; 356/483
(58) Field of Search ................................ 385/123, 126, 385/124, 127, 140; 356/483; 359/341, 345

(56) References Cited

U.S. PATENT DOCUMENTS

| | | | |
|---|---|---|---|
| 4,895,421 A | * | 1/1990 | Kim et al. ....................... 385/1 |
| 5,778,014 A | * | 7/1998 | Islam ........................... 356/483 |
| 5,861,973 A | * | 1/1999 | Inagaki et al. ........... 359/341.41 |
| 5,878,182 A | * | 3/1999 | Peckham .................... 385/123 |

OTHER PUBLICATIONS

S. Hamidi, et al., Electronics Letters, vol. 28, No. 18, pp. 1768–1770, Aug. 27, 1992.
E. Desurvire, et al., Electronics Letters, vol. 19, No. 19, pp. 751–753, Sep. 15, 1983.
Y. Aoki, et al., Electronics Letters, vol. 19, No. 16, pp. 620–622, Aug. 4, 1983.
M.J. Holmes, et al., Electronics Letters, vol. 26, No. 22, pp. 1873–1874, Oct. 25, 1990.
Takatoshi Kato, et al., "Design Optimization of Dispersion Shifted Fiber for WDM Transmission Considering Length Dependence of Cutoff Wavelength", pp. 160–161.
Noboru Edagawa, et al., "Fiber Raman Amplifiers", pp. 3–14, Mar. 13, 1989.

* cited by examiner

*Primary Examiner*—Robert H. Kim
*Assistant Examiner*—George Y. Wang
(74) *Attorney, Agent, or Firm*—McDermott, Will & Emery

(57) ABSTRACT

The present invention relates to an amplification optical fiber comprising a structure which can yield a higher amplification gain, and a fiber optic amplifier including the same. The fiber optic amplifier comprises, at least, an amplification optical fiber for amplifying signals having wavelengths different from each other, and a pumping light source for supplying pumping light for signal amplification. The amplification optical fiber has one end for inputting pumping light and has a cutoff wavelength shorter than the signal wavelength but longer than the pumping light wavelength.

17 Claims, 4 Drawing Sheets

AMPLIFICATION OPTICAL FIBER AND FIBER OPTIC AMPLIFIER INCLUDING THE SAME

BACKGROUND OF THE INVENTION

1. Field of the Invention

The present invention relates to an amplification optical fiber and a fiber optic amplifier including the same.

2. Related Background Art

A fiber optic amplifier is an optical device for amplifying a plurality of channels of signals so as to compensate for their loss when they propagate through an optical transmission line in an optical communication system; and comprises an amplification optical fiber and a pumping light source. Namely, if such a fiber optic amplifier is disposed at a predetermined position on an optical transmission line, then it amplifies the power of signals introduced to the amplification optical fiber to which pumping light of a predetermined wavelength is supplied from the pumping light source. Known as such a fiber optic amplifier are an amplifier in which an optical fiber whose optical waveguide region is doped with a rare-earth element is utilized as the amplification optical fiber (hereinafter referred to as rare-earth element doped fiber optic amplifier) and an amplifier utilizing Raman amplification (hereinafter referred to as Raman amplifier).

The Raman amplifier is described, for example, in literature 1, i.e., S. Hamidi, et al., Electronics Letters, Vol. 28, No. 18, pp. 1768–1770 (1992); literature 2, i.e., E. Desurvire, et al, Electronics Letters, Vol. 19, No. 19, pp. 751–753 (1983); and literature 3, i.e., Y. Aoki, et al., Electronics Letters, Vol. 19, No. 16, pp. 620–622 (1983). On the other hand, the optimization of refractive index profile of amplification optical fiber is described, for example, in literature 4, i.e., M. J. Holmes, et al, Electronics Letters, Vol. 26, No. 22, pp. 1873–1874 (1990).

SUMMARY OF THE INVENTION

The inventor has studied the above-mentioned conventional techniques and, as a result, have found problems as follows. Namely, amplification optical fibers employed in conventional fiber optic amplifiers ensure a single mode at each of the signal wavelength (e.g., 1.55 $\mu$m) and the wavelength of pumping light (e.g., 1.48 $\mu$m), thereby propagating only the fundamental mode ($LP_{01}$ mode) for each of them. In such a case, however, the effective area of an amplification optical fiber at the wavelength of pumping light (dependent on the power distribution in the fundamental mode of pumping light) becomes smaller than the effective area of the amplification optical fiber at the signal wavelength (dependent on the power distribution in the fundamental mode of signals).

Therefore, the conventional fiber optic amplifiers have failed to yield a sufficient amplification gain due to the difference between the respective effective areas of amplification optical fiber at two wavelengths different from each other. In particular, pumping is insufficient at a marginal portion of the core distanced from the center in the region contributing to amplification in the amplification optical fiber, whereby there is a possibility that the signal fails to be amplified or is absorbed on the contrary. Near the core center, in contrast, the amplification efficiency is higher than that at the marginal portion of core, thus yielding a higher signal power, whereby nonlinear optical phenomena are likely to occur. From such a viewpoint, there has been a limit to the enhancement of amplification gain. Further, a semiconductor laser light source (pumping light source) for outputting only the fundamental mode of pumping light is hard to yield a higher output, whereby there has been a limit to the enhancement of amplification gain from this viewpoint as well.

Though a plurality of semiconductor laser light sources may be used so as to enhance the power of pumping light supplied to the amplification optical fiber, this configuration is unfavorable since it complicates the fiber optic amplifier and raises the manufacturing cost.

For solving the problems such as those mentioned above, it is an object of the present invention to provide an amplification optical fiber comprising a structure which can yield a higher amplification gain, and a fiber optic amplifier including the same.

The fiber optic amplifier according to the present invention includes any of the Raman amplifier and rare-earth element doped fiber optic amplifier; and comprises, at least, a pumping light source for supplying pumping light of a predetermined wavelength and an amplification optical fiber.

Preferably, when the fiber optic amplifier is a Raman amplifier in particular, the amplification optical fiber (the amplification optical fiber according to the present invention) has one end for inputting pumping light of a predetermined wavelength and has, at an effective length, a cutoff wavelength which is shorter than a wavelength of signals but longer than the wavelength of pumping light. If the fiber optic amplifier is a rare-earth element doped fiber optic amplifier, in contrast, then it is preferred that the amplification optical fiber (the optical fiber according to the present invention) have one end for inputting pumping light and have, at a length of 2 m, a cutoff wavelength longer than the wavelength of pumping light.

Such an amplification optical fiber propagates only the fundamental mode for signals, but can propagate at least the second-order mode together with the fundamental mode for the pumping light. Namely, since the power distribution of a higher-order mode of pumping light is added to the power distribution of fundamental mode of pumping light, a power distribution approximating the power distribution of fundamental mode of signals is obtained. Consequently, the difference between the respective effective areas at the signal wavelength and at the pumping light wavelength effectively decreases, thereby enhancing the amplification gain. Since the amplification optical fiber can be pumped not only near the center of its core but also in the marginal portion of core contributing to amplification, the amplification optical fiber is suitable for enhancing the amplification gain in view of this point as well.

In an optical transmission system including the amplification optical fiber according to the present invention, the fundamental mode of signals propagating through the amplification optical fiber has a group velocity which differs from that of the fundamental mode and second-order mode of pumping light to such an extent that signals do not deteriorate an SN ratio thereof to a level which is problematic in terms of operation of the optical transmission system. This is because of the fact that, even when there is a difference in group velocity between the fundamental mode of signals and the fundamental mode of pumping light, the amplification gain is enhanced upon pumping by a higher-order mode of pumping light if the group velocity difference between the fundamental mode of signals and the higher-order mode of pumping light is small.

As mentioned above, the amplification optical fiber according to the present invention can propagate the second-order mode in addition to the fundamental mode for pumping light. Under a condition securing a single-mode operation in which only the fundamental mode is propagated for signals, the third- and higher-order modes of pumping light usually attenuate greatly. Hence, if the third- and higher-order modes of pumping light are kept from propagating, then the amplification gain can fully be enhanced.

Preferably, the amplification optical fiber according to the present invention includes a polarization-maintaining optical fiber for preserving respective polarization states of signals and pumping light upon propagation thereof. In this case, the respective polarization states of signals and pumping light coincide with each other, thereby enhancing the amplification gain.

In the case of Raman amplifier, it is preferred that the amplification optical fiber employed therein comprise a plurality of glass layers radially laminated in succession, among which at least a glass layer having the highest refractive index is doped with a material which enhances a Raman gain coefficient. Such a Raman amplifier can further improve the utilization efficiency of pumping light.

When the amplification optical fiber according to the present invention is applied to a rare-earth element doped fiber optic amplifier, the amplification optical fiber preferably has a cutoff wavelength of 1480 nm or more. Preferably, this cutoff wavelength is shorter than a wavelength of signals propagating through the amplification optical fiber.

DETAILED DESCRIPTION OF THE PREFERRED EMBODIMENTS

In the following, the amplification optical fiber according to the present invention and the fiber optic amplifier including the same will be explained in detail with reference to FIGS. 1 and 2A to 4B. In the explanation of drawings, constituents identical to each other will be referred to with numerals identical to each other without repeating their overlapping descriptions.

Figure 1:
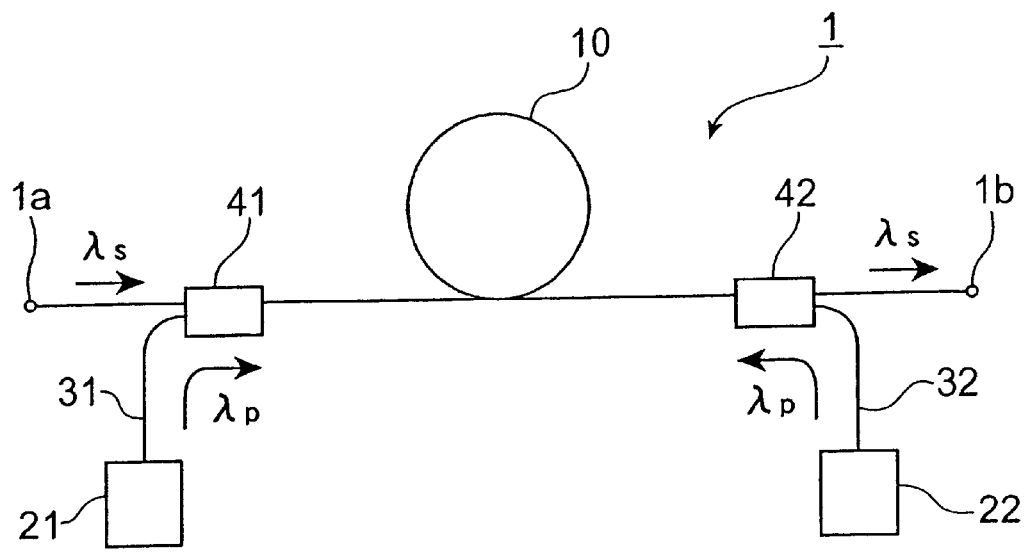
FIG. 1 is a view showing a schematic configuration of the fiber optic amplifier according to the present invention.

FIG. 1 is a view showing a schematic configuration of the fiber optic amplifier according to the present invention. In FIG. 1, the fiber optic amplifier 1 comprises an amplification optical fiber 10, pumping light sources 21, 22, pumping light supplying optical fibers 31, 32, and optical couplers 41, 42.

The amplification optical fiber 10 is applicable to any of the Raman amplifier and rare-earth element doped fiber optic amplifier, and can amplify signals when pumping light is supplied thereto. When the amplification optical fiber 10 is applied to a Raman amplifier, its cutoff wavelength $\lambda_c$ is preferably shorter than the signal wavelength $\lambda_s$ but longer than the wavelength $\lambda_p$ of pumping light. When the amplification optical fiber 10 is applied to a rare-earth element doped fiber optic amplifier, by contrast, its cutoff wavelength $\lambda_c$ at a length of 2 m is preferably shorter than the signal wavelength $\lambda_s$ but longer than the wavelength $\lambda_p$ of pumping light (e.g., 1480 nm or more). In any case, these three wavelengths satisfy the relationship of the following expression (1):

$$\lambda_p < \lambda_c < \lambda_s \tag{1}$$

Therefore, only the fundamental mode ($LP_{01}$ mode) propagates through the amplification optical fiber 10 for light at the signal wavelength $\lambda_s$, whereas at least the fundamental mode ($LP_{01}$ mode) and second-order mode ($LP_{11}$ mode) propagate through the amplification optical fiber 10 for light at the pumping wavelength $\lambda_p$.

The amplification optical fiber 10 may have any refractive index profile as long as the above-mentioned expression (1) holds. For example, FIGS. 2A and 2B are views showing a cross-sectional structure of a first applied example of the amplification optical fiber applicable to the fiber optic amplifier according to the present invention (the amplification optical fiber according to the present invention), and a refractive index profile thereof, respectively.

Figure 2A:
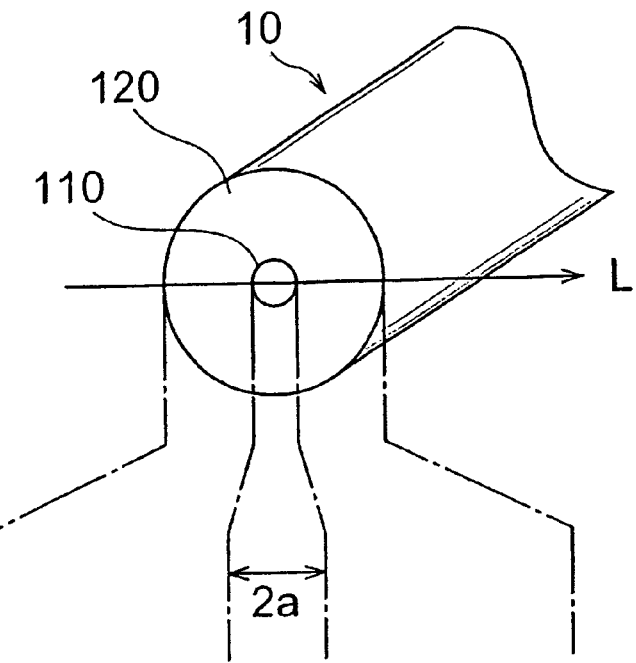
FIGS. 2A and 2B are views showing a cross-sectional structure of a first applied example of the amplification optical fiber applicable to the fiber optic amplifier shown in FIG. 1, and a refractive index profile thereof, respectively.

As shown in FIG. 2A, the amplification optical fiber according to the first applied example (step type) comprises a core region 110 extending along a predetermined axis and having a refractive index $n_{c1}$ and an outside diameter $2a$; and a cladding region 120, provided on the outer periphery of the core region 110, having a refractive index $n_0$ ($<n_{c1}$)

Figure 2B:
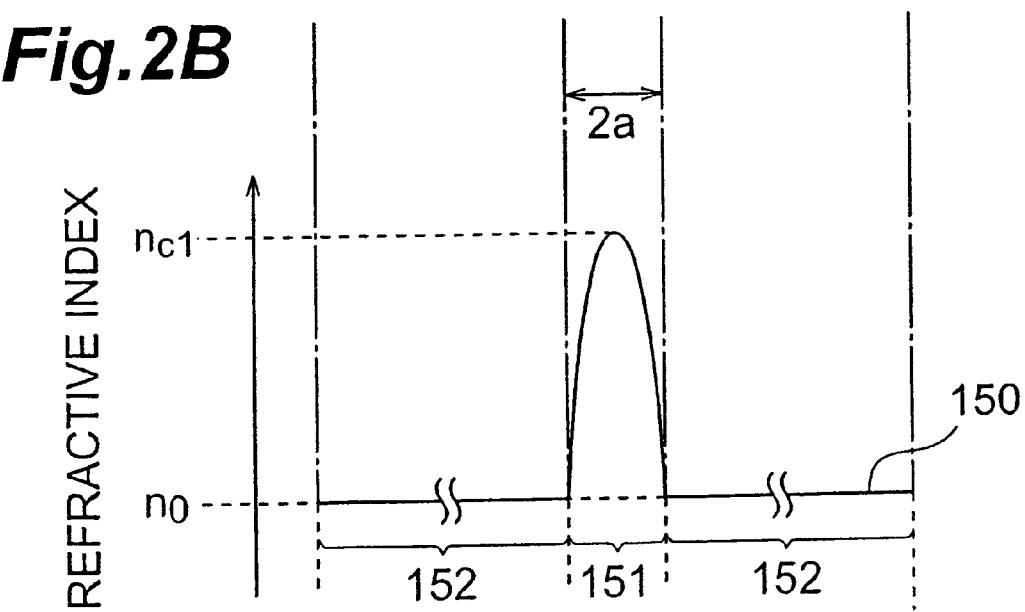

FIG. 2B shows a refractive index profile 150 of the amplification optical fiber according to the first applied example shown in FIG. 2A, indicating the refractive index along a line L on a cross section orthogonal to the signal advancing direction. Specifically, regions 151, 152 indicate the refractive indices on the line L of the core region 110 and cladding region 120, respectively, in the refractive index profile 150.

Figure 3A:
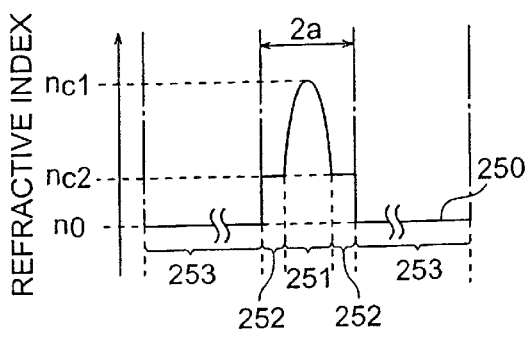
FIGS. 3A to 3E are views showing refractive index profiles of second to sixth applied examples of the amplification optical fiber applicable to the fiber optic amplifier shown in FIG. 1, respectively.

FIG. 3A shows a refractive index profile 250 of the amplification optical fiber according to a second applied example. The amplification optical fiber according to the second applied example also comprises, as shown in FIG. 2A, a core region 110 having an outside diameter $2a$ and a cladding region, provided on the outer periphery of the core region 110, having a refractive index $n_0$. Further, in the second applied example, the core region 110 (of dual shape type) comprises a first core having a refractive index $n_{c1}$ ($>n_0$) and a second core, provided on the outer periphery of the first core, having a refractive index $n_{c2}$ ($<n_{c1}$, $>n_0$). In the refractive index profile 250, regions 251, 252, 253 indicate the refractive indices on the line L of the first core, second core, and cladding region 120, respectively.

Figure 3B:
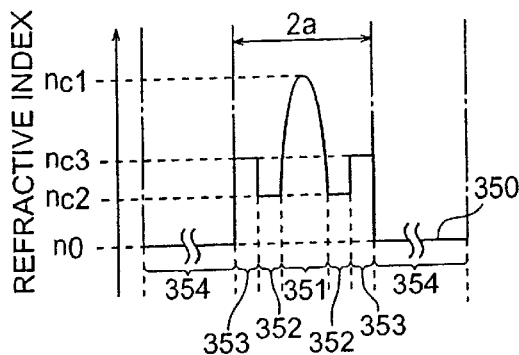

FIG. 3B shows a refractive index profile 350 of the amplification optical fiber according to a third applied example. The amplification optical fiber according to the third applied example also comprises, as shown in FIG. 2A, a core region 110 having an outside diameter $2a$ and a cladding region, provided on the outer periphery of the core region 110, having a refractive index $n_0$. Further, in the third applied example, the core region 110 (of segment type) comprises a first core having a refractive index $n_{c1}$ ($>n_0$) a second core, provided on the outer periphery of the first core, having a refractive index $n_{c2}$ ($<n_{c1}$, $\geq n_0$); and a third core, disposed at the outer periphery of the second core, having a refractive index $n_{c3}$ ($<n_{c1}$, $>n_{c2}$). In the refractive index profile 350, regions 351, 352, 353, 354 indicate the refractive indices on the line L of the first core, second core, third core, and cladding region 120, respectively.

Figure 3C:
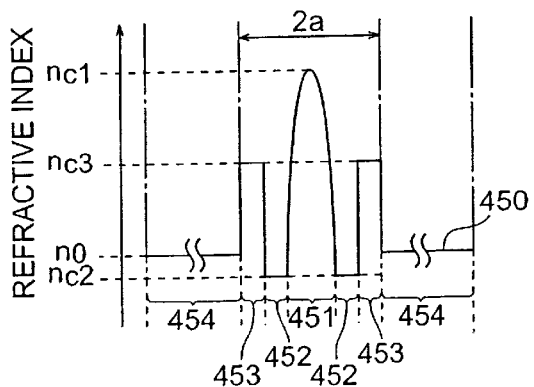

FIG. 3C shows a refractive index profile 450 of the amplification optical fiber according to a fourth applied example. The amplification optical fiber according to the fourth applied example also comprises, as shown in FIG. 2A, a core region 110 having an outside diameter $2a$ and a cladding region, provided on the outer periphery of the core region 110, having a refractive index $n_0$. Further, in the fourth applied example, the core region 110 (of depressed segment type) comprises a first core having a refractive index $n_{c1}$ ($>n_0$); a second core, provided on the outer periphery of the second core, having a refractive index $n_{c2}$ ($<n_0$); and a third core, disposed at the outer periphery of the second core, having a refractive index $n_{c3}$ ($<n_{c1}$, $>n_0$). In the refractive index profile 450, regions 451, 452, 453, 454 indicate the refractive indices on the line L of the first core, second core, third core, and cladding region 120, respectively.

Figure 3D:
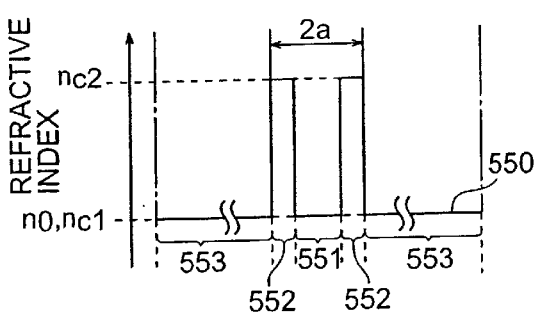

FIG. 3D shows a refractive index profile 550 of the amplification optical fiber according to a fifth applied example. The amplification optical fiber according to the fifth applied example also comprises, as shown in FIG. 2A, a core region 110 having an outside diameter $2a$ and a cladding region, provided on the outer periphery of the core region 110, having a refractive index $n_0$. Further, in the fifth applied example, the core region 110 (of ring type) comprises a first core having a refractive index $n_{c1}$ and a second core, provided on the outer periphery of the first core, having a refractive index $n_{c2}$ ($>n_{c1}$). In the refractive index profile 550, regions 551, 552, 553 indicate the refractive indices on the line L of the first core, second core, and cladding region 120, respectively.

Figure 3E:
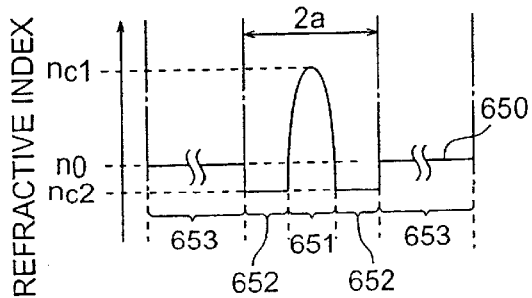

FIG. 3E shows a refractive index profile 650 of the amplification optical fiber according to a sixth applied example. The amplification optical fiber according to the sixth applied example also comprises, as shown in FIG. 2A, a core region 110 having an outside diameter $2a$ and a cladding region, provided on the outer periphery of the core region 110, having a refractive index $n_0$. Further, in the sixth applied example, the core region 110 (of W type) comprises a first core having a refractive index $n_{c1}$ ($>n_0$) and a second core, provided on the outer periphery of the first core, having a refractive index $n_{c2}$ ($<n_0$). In the refractive index profile 650, regions 651, 652, 653 indicate the refractive indices on the line L of the first core, second core, and cladding region 120, respectively.

Each of the amplification optical fibers according to the first to sixth applied examples having the above-mentioned refractive index profiles 150 to 650 (FIGS. 2B to 3E) is applicable to the fiber optic amplifier 1 according to the present invention.

In the case where the fiber optic amplifier 1 is a rare-earth element doped fiber optic amplifier, the optical waveguide region of amplification optical fiber 10 is doped with a rare-earth element such as Er, Tm, Pr, or Nd, for example. In the case where the fiber optic amplifier is a Raman amplifier, it is preferred that at least a region where the refractive index is maximized in the amplification optical fiber 10 be doped with a material which enhances a Raman gain coefficient such as Ge, Al, or P, for example, whereby the amplification gain further increases. The region where the refractive index is maximized in the amplification optical fiber 10 is a predetermined area including a peak position of the power distribution of fundamental mode. For example, it corresponds to the center part of core region 110 in the step type amplification optical fiber (FIGS. 2A and 2B), and to the first core (region having the refractive index $n_{c1}$) in each of the amplification optical fibers of dual shape type (FIG. 3A), segment type (FIG. 3B), depressed segment type (FIG. 3C), and W type (FIG. 3E). In the amplification optical fiber of ring type (FIG. 3D), the region where the refractive index is maximized corresponds to the second core (having the refractive index $n_{c2}$).

Preferably, the signal wavelength $\lambda_s$ is near 1.55 µm at which transmission loss is the lowest in silica type optical fibers in general. In this case, if the fiber optic amplifier 1 according to the present invention is a rare-earth element doped fiber optic amplifier, then the pumping light wavelength $\lambda_p$ is 1.4 µm or 0.98 µm. When the fiber optic amplifier 1 according to the present invention is a Raman amplifier, on the other hand, the pumping light wavelength $\lambda_p$ is preferably a wavelength ranging from 1.40 to 1.50 µm.

In general, the cutoff wavelength $\lambda_c$ of amplification optical fiber 10 is defined as a cutoff wavelength of second-order ($LP_{11}$) mode measured in a state where the amplification optical fiber 10 having a length of 2 m is loosely wound by one turn about a mandrel having a radius of 140 mm (ITU-G. 650). When the fiber optic amplifier 1 is a rare-earth element doped fiber optic amplifier, whereas the length of amplification optical fiber 10 is several to several hundreds of meters, thus defined cutoff wavelength $\lambda_c$ is employed.

On the other hand, if the fiber optic amplifier 1 is a Raman amplifier, whereas the length of amplification optical fiber 10 is several tens to several hundreds of meters, then the cutoff wavelength $\lambda_c$ of amplification optical fiber 10 is defined with respect to the effective length $L_{eff}$ of amplification optical fiber 10 represented by the following expression:

$$L_{eff} = [1 - \exp(-\alpha L)]/L \qquad (2)$$

where $\alpha$ is the transmission loss of amplification optical fiber 10 at the pumping light wavelength, and L is the total length of amplification optical fiber 10. Also, the effective length $L_{eff}$ of amplification optical fiber 10 is an effective length by which the pumping light contributes to amplification.

Each of the pumping light sources 21, 22 is an optical component for outputting pumping light to be supplied to the amplification optical fiber 10, and is preferably a semiconductor laser light source, for example. Each of the pumping light sources 21, 22 outputs not only the fundamental mode of pumping light but also at least the second-order mode of pumping light. The pumping light supplying optical fiber 31 guides the pumping light (including the fundamental mode and the second-order mode) from the pumping light source 21 into the optical coupler 41. The pumping light supplying optical fiber 32 guides the pumping light (including the fundamental mode and the second-order mode) from the pumping light source 22 into the optical coupler 42.

The optical coupler 41 acts such that the signal introduced from an entrance end 1a is guided to the signal input end of amplification optical fiber 10, and that the pumping light having reached there by way of the pumping light supplying optical fiber 31 from the pumping light source 21 is also guided to the signal input end of amplification optical fiber 10. On the other hand, the optical coupler 42 acts such that the signal outputted from the signal output end of amplification optical fiber 10 is guided to an exit end 1b, and that the pumping light having reached there by way of the pumping light supplying optical fiber 32 from the pumping light source 22 is guided to the signal output end of amplification optical fiber 10.

The fiber optic amplifier 1 may be provided with an optical isolator which propagates light only in a forward direction (coinciding with the signal advancing direction). This optical isolator is provided between the entrance end 1a and the optical coupler 41 or between the optical coupler 42 and the exit end 1b. The fiber optic amplifier 1 may be configured so as to utilize only one of the pumping light sources 21, 22. In this case, the pumping light supplying fiber and optical coupler corresponding to the unnecessary pumping light source also become unnecessary.

In thus configured fiber optic amplifier 1, the pumping light (including the fundamental mode and second-order mode) outputted from the pumping light source 21 successively passes through the pumping light supplying optical fiber 31 and the optical coupler 41, and then is forwardly supplied to the amplification optical fiber 10. The pumping light (including the fundamental mode and second-order mode) outputted from the pumping light source 22 successively passes through the pumping light supplying optical fiber 32 and the optical coupler 42, and then is supplied to the amplification optical fiber 10 in a direction opposite to the forward direction. A plurality of channels of signals introduced from the entrance end 1a pass through the optical coupler 41 and then reach the amplification optical fiber 10. Then, the signal light amplified by the amplification optical fiber 10 is outputted to the exit end 1b by way of the optical coupler 42.

Since the relationship; of the above-mentioned expression (1) holds among the cutoff wavelength $\lambda_c$, signal wavelength $\lambda_s$, and pumping light wavelength $\lambda_p$ in the amplification optical fiber 10, only the fundamental mode ($LP_{01}$ mode) propagates through the amplification optical fiber 10 for the signals. For the pumping light, by contrast, at least the fundamental mode ($LP_{01}$ mode) and second-order mode ($LP_{11}$ mode) propagate through the amplification optical fiber 10.

Figure 4A:
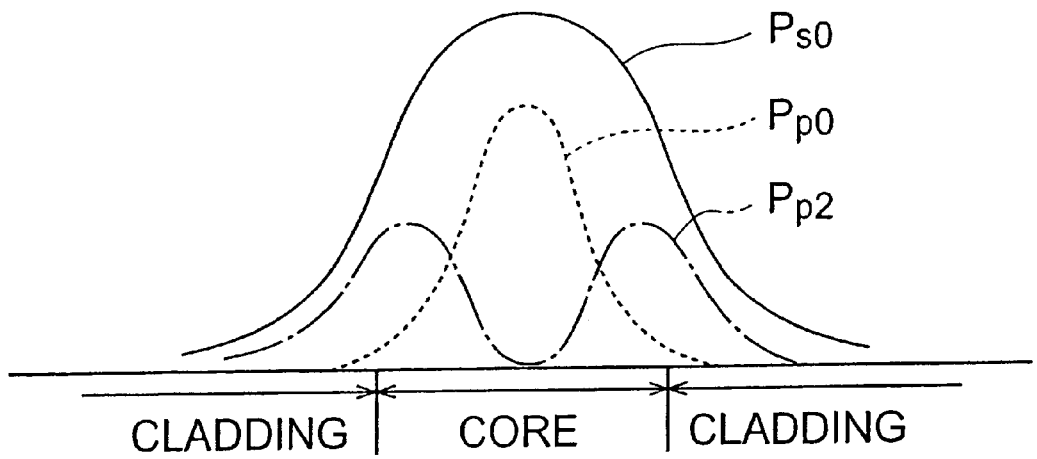
FIGS. 4A and 4B are views for explaining power distributions of light propagating through amplification optical fibers.
Figure 4B:
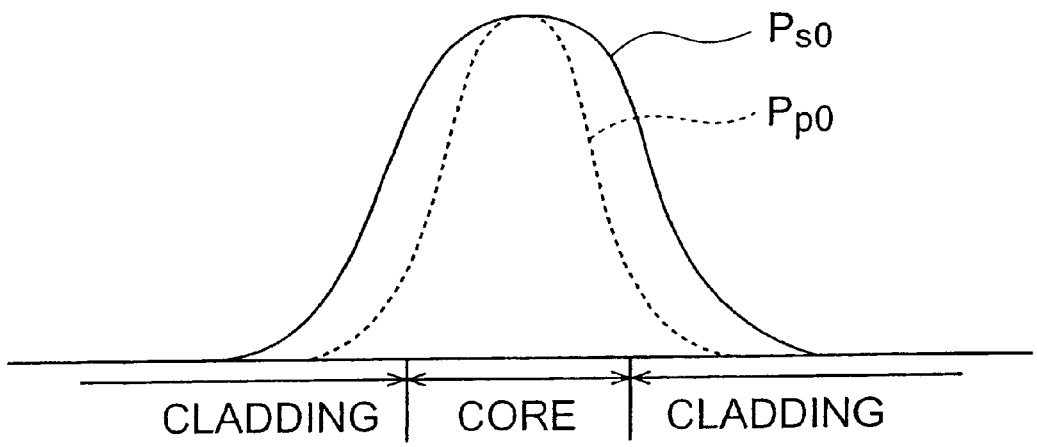

FIGS. 4A and 4B are views for explaining power distributions of light propagating through amplification optical fibers. In particular, FIG. 4A shows the respective power distributions of the fundamental mode ($P_{S0}$) of signals, fundamental mode ($P_{P0}$) of pumping light, and second-order mode ($P_{P2}$) of pumping light propagating through the amplification optical fiber 10 according to the present invention. On the other hand, FIG. 4B shows the respective power distributions of the fundamental mode ($P_{S0}$) of signals and fundamental mode ($P_{P0}$) of pumping light propagating through a conventional amplification optical fiber which is a comparative example. Each of them is an optical power distribution on a line orthogonal to the optical axis of optical fiber.

In the amplification optical fiber as the comparative example (FIG. 4B), the cutoff wavelength $\lambda_c$ is shorter than each of the signal wavelength $\lambda_s$ and the pumping light wavelength $\lambda_p$, whereby only the fundamental mode can propagate for the signals, and only the fundamental mode can propagate for the pumping light as well. In general, the shorter is the wavelength, the smaller becomes the width of power distribution of light, and the smaller becomes the effective area even in the fundamental mode. Namely, as shown in FIG. 4B, the effective area for the fundamental mode of pumping light (having a wavelength shorter than that of signals) is smaller than the effective area for the fundamental mode of signals. Therefore, as mentioned above, a sufficient amplification gain may not be obtained due to the difference between the respective effective areas of amplification optical fiber at the two wavelengths in the fiber optic amplifier in which the amplification optical fiber of the comparative example is employed. Also, since amplification efficiency remarkably rises in the vicinity of the core center of amplification optical fiber, nonlinear optical phenomena are likely to occur due to the increase in signal power. There is a limit to the enhancement of amplification gain in the amplification optical fiber of the comparative example in view of this point as well.

In the amplification optical fiber 10 according to the present invention as shown in FIG. 4A, in contrast, only the fundamental mode ($LP_{01}$ mode) propagates for the signals, whereas at least the fundamental mode ($LP_{01}$ mode) and second-order mode ($LP_{11}$ mode) propagate for the pumping light. The effective area of amplification optical fiber 10 at the pumping light wavelength of fundamental mode becomes smaller than the effective area of amplification optical fiber 10 at the signal wavelength of fundamental mode in this case as well. In the amplification optical fiber 10 according to the present invention, however, the second-order mode of pumping light can also propagate. Therefore, a power distribution approximating the power distribution of the fundamental mode of signals is obtained when the power distribution of the second-order mode of pumping light is added to the power distribution of the fundamental mode of pumping light (FIG. 4A).

In the amplification optical fiber in the fiber optic amplifier 1 according to the present invention, as a consequence of the foregoing, the difference between the effective area for signals and the effective area for the pumping light (including the fundamental mode and second-order mode) becomes effectively smaller, thereby sufficiently enhancing the amplification gain. Also, since the amplification optical fiber 10 can be pumped not only near the center of its core but also in the marginal portion of core contributing to amplification, it is preferable for enhancing the amplification gain in view of this point as well.

If the fiber optic amplifier 1 according to the present invention is a Raman amplifier, whereas the pumping light is supplied in a forward direction (coinciding the signal traveling direction), then the fluctuation of pumping light power is added to signals to be outputted. In this case, if the pumping light propagates at a group velocity substantially identical to that of the signals, then the fluctuation of pumping light power keeps affecting the signals for a long time with a predetermined cycle, whereby there is a fear of transmission characteristics deteriorating more. Therefore, it is preferred that the difference in group velocity between the pumping light and signals be made greater. On the other hand, the group velocity of fundamental mode and that of a higher-order mode differ from each other in general at the same wavelength of light, so that the latter velocity is usually lower.

Hence, it is preferred that the following expression hold:

$$V_{P1} \ll V_S, V_S \ll V_{P2} \quad (3)$$

where $V_S$ is the group velocity of fundamental mode of signals, $V_{P1}$ is the group velocity of fundamental mode of pumping light, and $V_{P2}$ is the group velocity of second-order mode of pumping light.

Further, if the relationship of $V_{P2} \ll V_{P1}$ holds, then it is preferred that the following expression (4) hold:

$$V_{P2} \ll V_S \ll V_{P1} \quad (4)$$

Under a condition securing a single-mode operation in which only the fundamental mode is propagated for signals, the third- and higher-order modes of pumping light usually attenuate greatly, whereby it is sufficient for the amplification optical fiber 10 to propagate only the fundamental mode and second-order mode for the pumping light.

The Raman amplification gain has been known to increase when the respective polarization states of signals and pumping light coincide with each other. Therefore, the amplification optical fiber 10 according to the present invention preferably includes a polarization-maintaining optical fiber for preserving the respective polarization states of signals and pumping light upon propagation thereof.

In accordance with the present invention, as in the foregoing, the amplification optical fiber applicable to the Raman amplifier has, at an effective length, a cutoff wavelength which is shorter than the signal wavelength but longer than the pumping light wavelength, whereas the amplification optical fiber applicable to the rare-earth element doped fiber optic amplifier has, at a length of 2 m, a cutoff wavelength shorter than the signal wavelength but longer than the pumping light wavelength. As a consequence, the amplification optical fiber applicable to any of the fiber optic amplifiers propagates only the fundamental mode for signals, but can propagate not only the fundamental mode but also at least the second-order mode for pumping light. Since the power distribution of a higher-mode of pumping light is added to the power distribution of fundamental mode of pumping light, a power distribution approximating the power distribution of fundamental mode of signals is obtained, so that the difference between the effective area at the signal wavelength and the effective area at the pumping light wavelength becomes effectively smaller, whereby the amplification gain is fully enhanced.

What is claimed is:

1. An amplification optical fiber, having a plurality of glass layers radially laminated in succession, for amplifying signals having wavelengths different from each other,
   said amplification optical fiber having one end for inputting pumping light of a predetermined wavelength and having, at an effective length, a cutoff wavelength shorter than a wavelength of said signals but longer than said wavelength of pumping light.

2. An amplification optical fiber according to claim 1, wherein a fundamental mode of said signals has a group velocity which differs from that of fundamental and second-order modes of said pumping light to such an extent that said signals do not deteriorate an SN ratio thereof to a level which is problematic in terms of operation of an optical transmission system including said amplification optical fiber.

3. An amplification optical fiber according to claim 1, wherein modes of said pumping light which propagate through said amplification optical fiber are constituted by only said fundamental and second-order modes.

4. An amplification optical fiber according to claim 1, wherein said amplification optical fiber includes a polarization-maintaining optical fiber for preserving respective polarization states of said signals and pumping light upon propagation thereof.

5. An amplification optical fiber according to claim 1, wherein, among said plurality of glass layers, at least a glass layer having the highest refractive index is doped with a material which enhances a Raman gain coefficient.

6. A fiber optic amplifier for amplifying signals in a predetermined wavelength band, said fiber optic amplifier comprising:
   a pumping light source for supplying pumping light of a predetermined wavelength; and
   said amplification optical fiber according to claim 1.

7. An amplification optical fiber, having a plurality of glass layers radially laminated in succession, for amplifying signals having wavelengths different from each other,
   said amplification optical fiber having one end for inputting pumping light of a predetermined wavelength, wherein a fundamental mode of said signals has a group velocity which differs from that of fundamental and second-order modes of said pumping light to such an extent that said signals do not deteriorate an SN ratio thereof to a level which is problematic in terms of operation of an optical transmission system including said amplification optical fiber.

8. An amplification optical fiber according to claim 7, wherein modes of said pumping light which propagate through said amplification optical fiber are constituted by only said fundamental and second-order modes.

9. An amplification optical fiber according to claim 7, wherein said amplification optical fiber includes a polarization-maintaining optical fiber for preserving respective polarization states of said signals and pumping light upon propagation thereof.

10. An amplification optical fiber according to claim 7, wherein, among said plurality of glass layers, at least a glass layer having the highest refractive index is doped with a material which enhances a Raman gain coefficient.

11. A fiber optic amplifier for amplifying a signal in a predetermined wavelength band, said fiber optic amplifier comprising:
    a pumping light source for supplying pumping light of a predetermined wavelength; and
    said amplification optical fiber according to claim 7.

12. An amplification optical fiber, having a plurality of glass layers radially laminated in succession, for amplifying signals having wavelengths different from each other,
    said amplification optical fiber having one end for inputting pumping light of a predetermined wavelength and having, at a length of 2 m, a cutoff wavelength shorter than a wavelength of said signals but longer than said wavelength of pumping light.

13. An amplification optical fiber according to claim 12, wherein said cutoff wavelength is 1480 nm or more.

14. An amplification optical fiber according to claim 12, wherein a fundamental mode of said signals has a group velocity which differs from that of fundamental and second-order modes of said pumping light to such an extent that said signals do not deteriorate an SN ratio thereof to a level which is problematic in terms of operation of an optical transmission system including said amplification optical fiber.

15. An amplification optical fiber according to claim 12, wherein modes of said pumping light which propagate through said amplification optical fiber are constituted by only said fundamental and second-order modes.

16. An amplification optical fiber according to claim 12, wherein said amplification optical fiber includes a polarization-maintaining optical fiber for preserving respective polarization states of said signals and pumping light upon propagation thereof.

17. A fiber optic amplifier for amplifying signals in a predetermined wavelength band, said fiber optic amplifier comprising:
    a pumping light source for supplying pumping light of a predetermined wavelength; and
    said amplification optical fiber according to claim 12.

* * * * *